(12) United States Patent
Nomura et al.

(10) Patent No.: US 9,473,673 B2
(45) Date of Patent: Oct. 18, 2016

(54) READ IMAGE CAPTURING SYSTEM THAT CAPTURES READ IMAGE IN ASSOCIATION WITH USER, READ IMAGE CAPTURING DEVICE, AND RECORDING MEDIUM

(71) Applicant: Kyocera Document Solutions Inc., Osaka (JP)

(72) Inventors: Takashi Nomura, Osaka (JP); Daisuke Yoshida, Osaka (JP); Takeshi Nakamura, Osaka (JP); Katsuhiro Minoru, Osaka (JP); Yuichi Obayashi, Osaka (JP); Jumpei Takagi, Osaka (JP); Chika Tsuji, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/836,880

(22) Filed: Aug. 26, 2015

(65) Prior Publication Data
US 2016/0065787 A1 Mar. 3, 2016

(30) Foreign Application Priority Data
Aug. 26, 2014 (JP) ................................. 2014-172106

(51) Int. Cl.
*H04N 1/00* (2006.01)
*H04N 1/44* (2006.01)

(52) U.S. Cl.
CPC .......... *H04N 1/442* (2013.01); *H04N 1/00209* (2013.01); *H04N 1/00854* (2013.01); *H04N 2201/0081* (2013.01); *H04N 2201/0094* (2013.01); *H04N 2201/3235* (2013.01)

(58) Field of Classification Search
None
See application file for complete search history.

(56) References Cited

U.S. PATENT DOCUMENTS

| 8,688,592 B1* | 4/2014 | Abramson | G06Q 20/4014 705/75 |
|---|---|---|---|
| 2008/0183536 A1* | 7/2008 | Hirabayashi | G06Q 10/06 382/100 |
| 2009/0313245 A1* | 12/2009 | Weyl | G06F 17/30253 |

FOREIGN PATENT DOCUMENTS

| JP | 2012-164111 A | 8/2012 |
|---|---|---|
| JP | 2012-168050 A | 9/2012 |

* cited by examiner

*Primary Examiner* — Andrew H Lam
(74) *Attorney, Agent, or Firm* — James Judge

(57) ABSTRACT

A read image capturing system includes a reading device, a read image capturing circuit, and a signature managing circuit. The reading device reads an image from an original document. The read image capturing circuit captures the read image read by the reading device. The signature managing circuit manages a signature image for causing the read image capturing circuit to capture the read image as a signature capturing image for each user. The read image capturing circuit that captures the read image in association with a user who is associated with the signature capturing image by the signature managing circuit, the signature capturing image having a similarity degree with the signature image included in the read image equal to or more than a similarity degree for capture.

15 Claims, 6 Drawing Sheets

READ IMAGE CAPTURING SYSTEM THAT CAPTURES READ IMAGE IN ASSOCIATION WITH USER, READ IMAGE CAPTURING DEVICE, AND RECORDING MEDIUM

INCORPORATION BY REFERENCE

This application is based upon, and claims the benefit of priority from, corresponding Japanese Patent Application No. 2014-172106 filed in the Japan Patent Office on Aug. 26, 2014, the entire contents of which are incorporated herein by reference.

BACKGROUND

Unless otherwise indicated herein, the description in this section is not prior art to the claims in this application and is not admitted to be prior art by inclusion in this section.

There is known a system that causes a user to log on using an ID and a password. With the system causing the user to log on using the ID and the password, after the user has logged on the system using the ID and the password, a reading device captures an image read from an original document so as to capture the image, which has been read from the original document by the reading device, in association with the user.

SUMMARY

A read image capturing system according to an aspect of the disclosure includes a reading device, a read image capturing circuit, and a signature managing circuit. The reading device reads an image from an original document. The read image capturing circuit captures the read image read by the reading device. The signature managing circuit manages a signature image for causing the read image capturing circuit to capture the read image as a signature capturing image for each user. The read image capturing circuit captures the read image in association with a user who is associated with the signature capturing image by the signature managing circuit, the signature capturing image having a similarity degree with the signature image included in the read image equal to or more than a similarity degree for capture.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
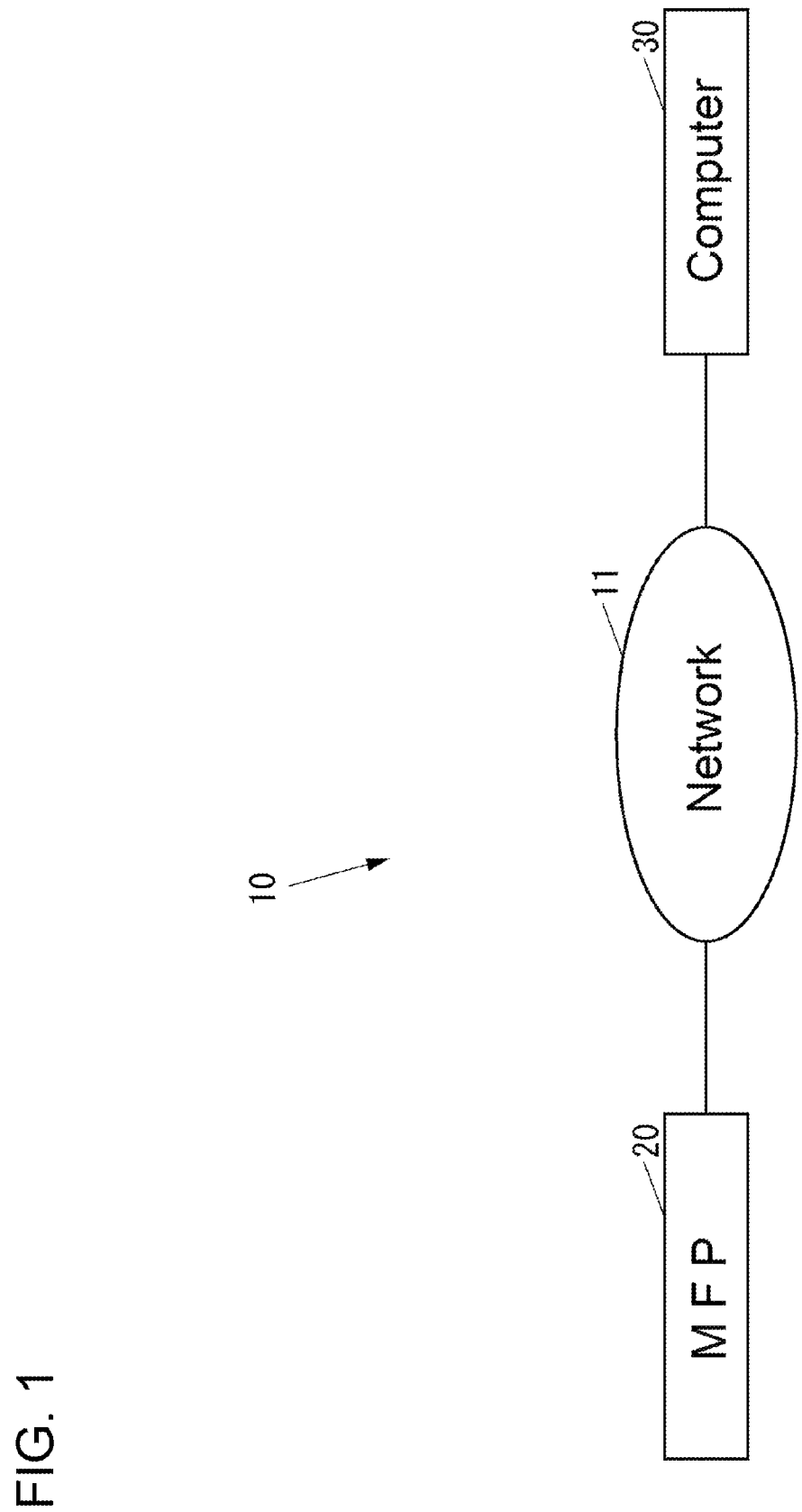
FIG. 1 illustrates a read image capturing system according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

First, a description will be given of a configuration of a read image capturing system according to the embodiment.

FIG. 1 illustrates a read image capturing system 10 according to the embodiment.

As illustrated in FIG. 1, the read image capturing system 10 includes a Multifunction Peripheral (MFP) 20 and a computer 30 such as a Personal Computer (PC). The MFP 20 functions as an image reading apparatus for reading an image from an original document. The computer 30 ensures a specific workflow system such as a workflow system for approval in a company. The MFP 20 and the computer 30 are connected in a communicable manner with each other via a network 11 such as a Local Area Network (LAN) and the Internet.

Figure 2:
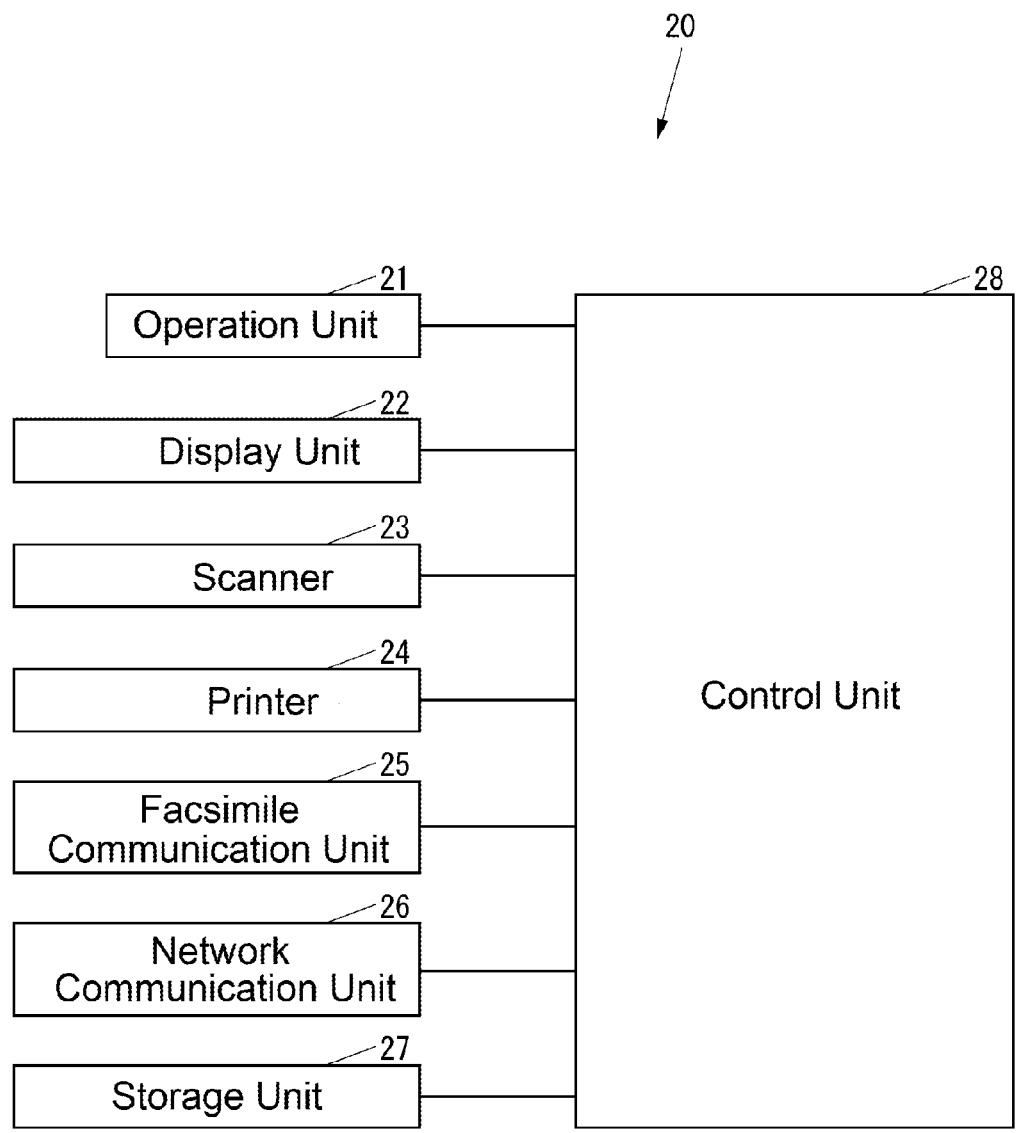
FIG. 2 illustrates the configuration of an MFP according to the embodiment.

FIG. 2 illustrates the configuration of the MFP 20.

As illustrated in FIG. 2, the MFP 20 includes an operation unit 21, a display unit 22, a scanner 23, a printer 24, a facsimile communication unit 25, a network communication unit 26, a storage unit 27, and a control unit 28 that controls the entire MFP 20. The operation unit 21 is an input device such as a button for inputting various operations. The display unit 22 is a display device such as a Liquid Crystal Display (LCD) that displays various types of information. The scanner 23 is a reading device that reads an image from an original document. The printer 24 is a print device that executes a print job on a recording medium such as a paper sheet. The facsimile communication unit 25 is a facsimile device such as a facsimile communication board that performs facsimile communication with an external facsimile device via a communication line such as a dial-up line. The network communication unit 26 is a network communication device such as a network interface card that communicates with an external device via the network 11 (see FIG. 1). The storage unit 27 is a non-volatile and non-transitory computer-readable storage device such as an Electrically Erasable Programmable Read Only Memory (EEPROM) and a Hard Disk Drive (HDD) that stores various data.

The control unit 28 is a circuit that includes, for example, a Central Processing Unit (CPU), a Read Only Memory (ROM), which stores a program and various data, a Random Access Memory (RAM), which is used for a work area of the CPU. CPU executes a program stored in the ROM or the storage unit 27.

Figure 3:
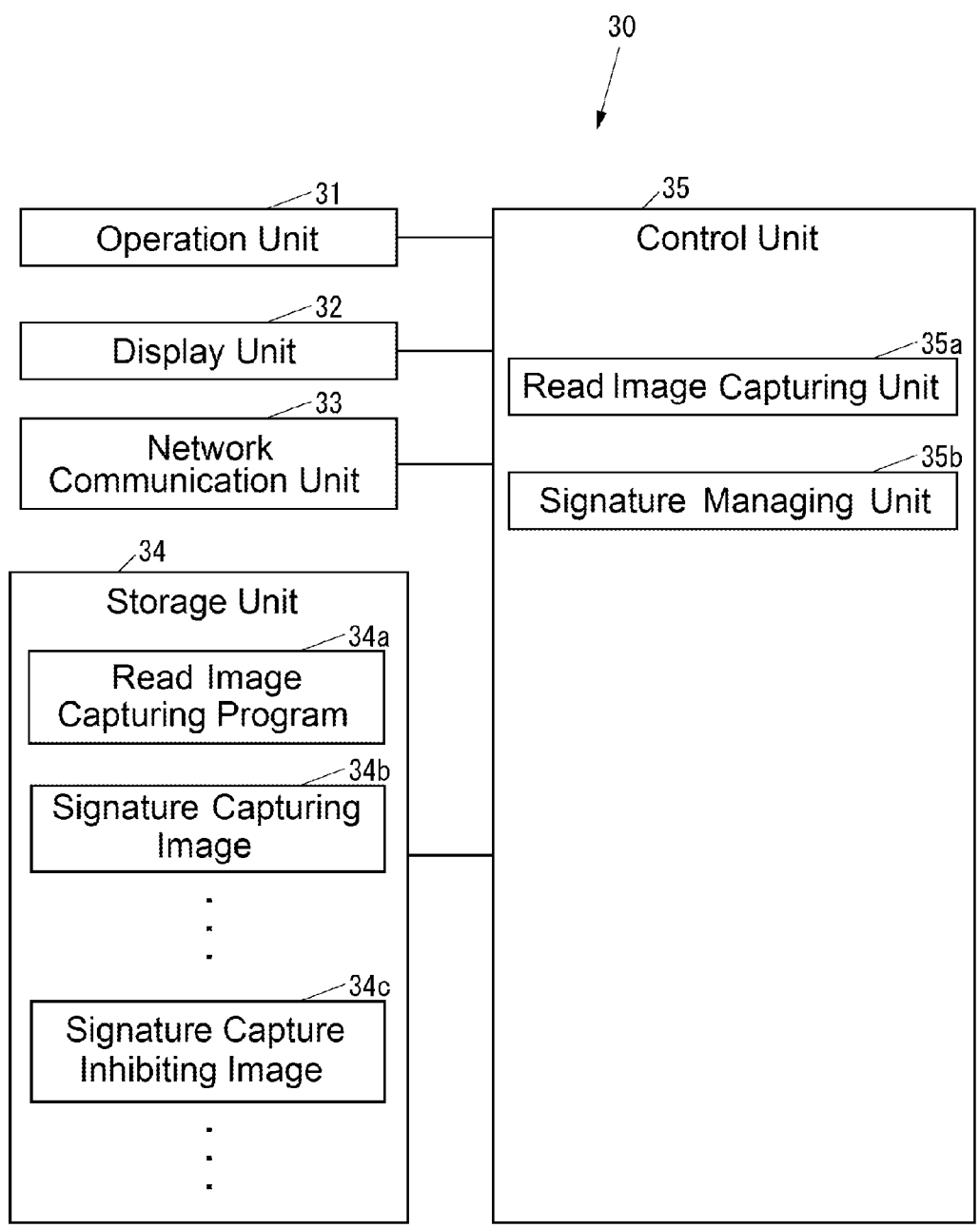
FIG. 3 illustrates the configuration of a computer according to the embodiment.

FIG. 3 illustrates the configuration of the computer 30.

As illustrated in FIG. 3, the computer 30 includes an operation unit 31, a display unit 32, a network communication unit 33, a storage unit 34, and a control unit 35 that controls the entire computer 30. The operation unit 31 is an input device such as a computer mouse and a keyboard for inputting various operations. The display unit 32 is a display device such as a LCD that displays various types of information. The network communication unit 33 is a network communication device such as a network interface card that communicates with an external device via the network 11 (see FIG. 1). The storage unit 34 is a non-volatile storage device such as a HDD that stores a program and various data.

The storage unit 34 stores a read image capturing program 34a to capture a read image read from an original document such as a note-register by the scanner 23 (see FIG. 2) in association with a user. Namely, the computer 30 is configured as a read image capturing device according to the disclosure.

The storage unit 34 can store a signature capturing image 34b for capturing the read image and a signature capture inhibiting image 34c for inhibiting capture of the read image for each user. Identification information of the associated user (hereinafter referred to as "user identification information") is associated with each of the signature capturing image 34b and the signature capture inhibiting image 34c. Identification information (hereinafter referred to as "signature image identification information") is added to each of the signature capturing image 34b and the signature capture inhibiting image 34c.

The control unit 35 includes, for example, a CPU, a ROM, which stores a program and various data, and a RAM, which is used for a work area of the CPU. The CPU is a circuit that executes the program stored in the ROM or the storage unit 34.

The control unit 35 executes the read image capturing program 34a, which is stored in the storage unit 34, to function as a read image capturing unit 35a, which captures the read image read from the original document by the scanner 23, and a signature managing unit 35b. The signature managing unit 35b is a circuit that manages the signature image for each user.

Next, an operation of the read image capturing system 10 will be described.

First, a description will be given of the operation of the computer 30 when the computer 30 stores the signature capturing image 34b.

Figure 4:
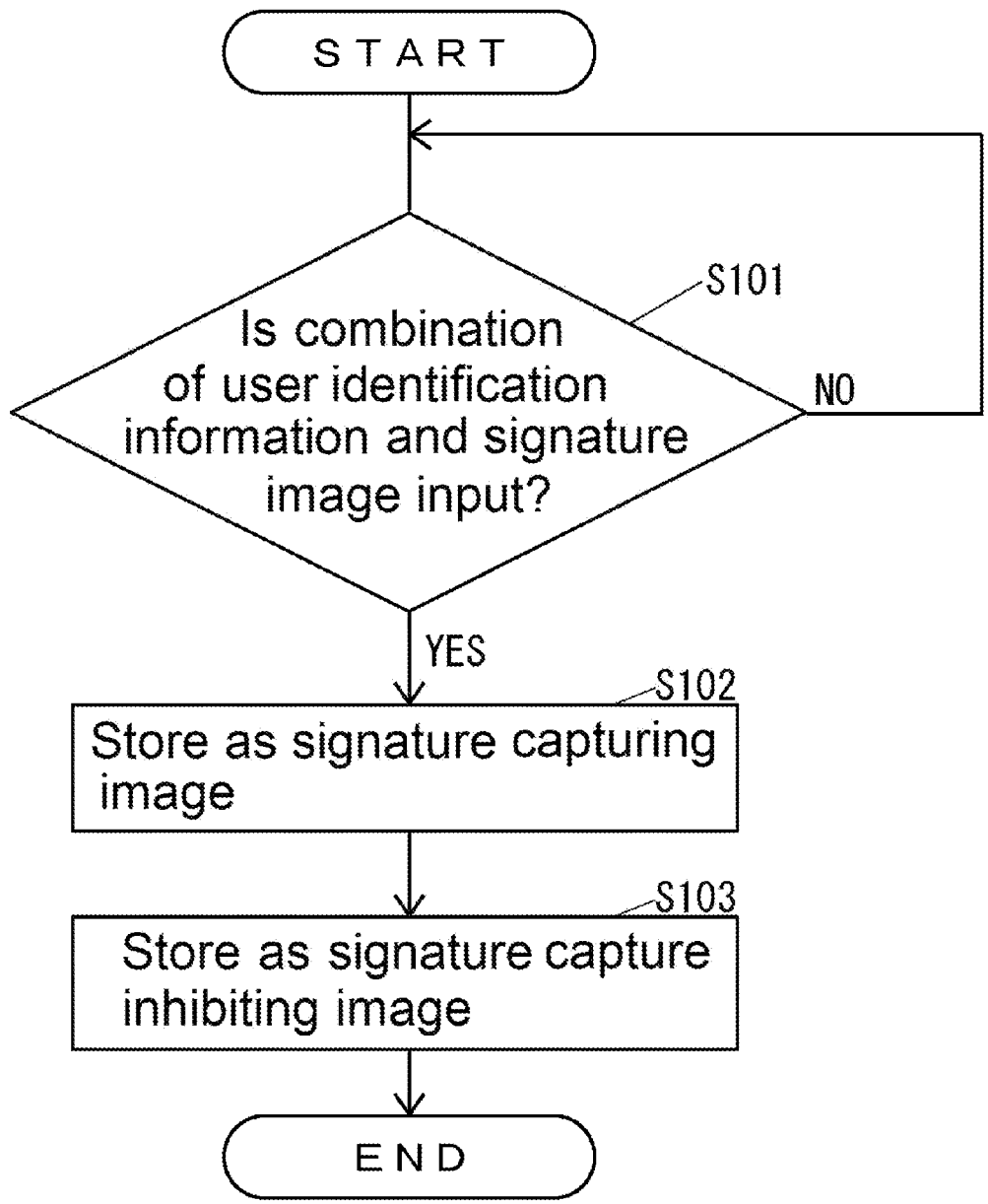
FIG. 4 illustrates an operation of the computer according to the embodiment when the computer stores a signature capturing image.

When the start of the process to store the signature capturing image 34b is instructed via the operation unit 31 or the network communication unit 33, the signature managing unit 35b of the computer 30 starts the operation indicated in FIG. 4.

FIG. 4 illustrates the operation of the computer 30 when the computer 30 stores the signature capturing image 34b.

As illustrated in FIG. 4, the signature managing unit 35b determines whether or not a combination of the user identification information and the signature image is input via the network communication unit 33 until the signature managing unit 35b determines the combination of the user identification information and the signature image is input via the network communication unit 33 (Step S101). Here, the signature image can be read by the scanner 23 of the MFP 20, for example.

When the signature managing unit 35b determines that a combination of the user identification information and the signature image is input at Step S101, the signature managing unit 35b causes the storage unit 34 to store the input signature image as the signature capturing image 34b in association with the input user identification information (Step S102). Namely, the signature managing unit 35b causes the storage unit 34 to store the signature image as the signature capturing image 34b for each user.

Next, the signature managing unit 35b causes the storage unit 34 to store the signature image, which is stored as the signature capturing image 34b at Step S102, as the signature capture inhibiting image 34c in association with the user identification information, which is associated with the signature capturing image 34b at Step S102 (Step S103). Namely, the signature managing unit 35b causes the storage unit 34 to store the signature image as the signature capture inhibiting image 34c for each user.

The signature managing unit 35b terminates the operation indicated in FIG. 4 after the process of Step S103.

Next, a description will be given of the operation of the read image capturing system 10 when the read image capturing system 10 captures a read image, which is read from an original document including a handwritten signature by the scanner 23, in association with a user.

First, the operation of the MFP 20 when the MFP 20 reads an image from an original document will be described.

Figure 5:
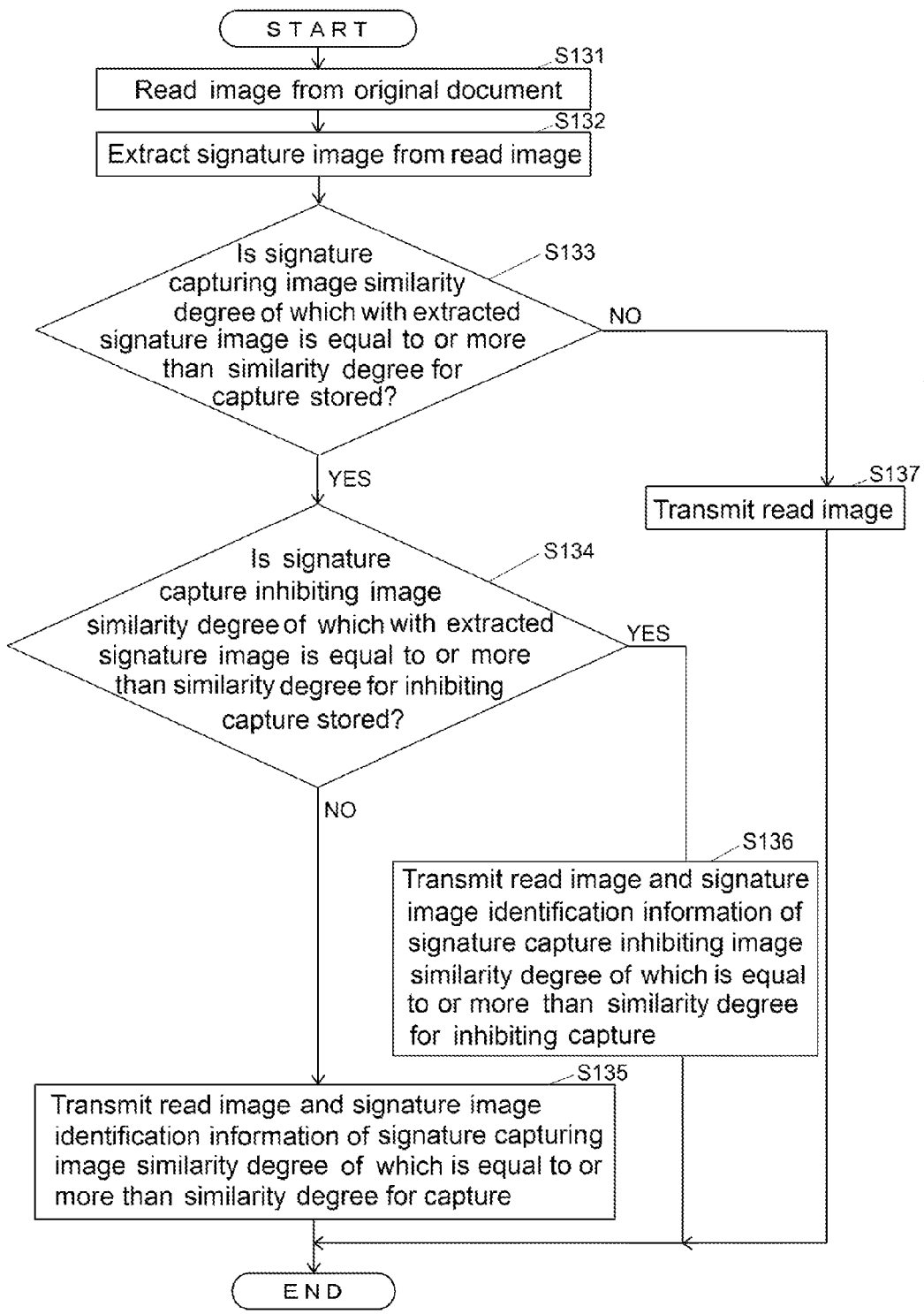
FIG. 5 illustrates an operation of the MFP according to the embodiment when the MFP reads an image from an original document.

FIG. 5 illustrates the operation of the MFP 20 when the MFP 20 reads an image from an original document.

As illustrated in FIG. 5, the control unit 28 of the MFP 20 reads an image from an original document by the scanner 23 (Step S131). Then, the control unit 28 extracts a signature image from the read image, which is read from the original document by the scanner 23 (Step S132).

The control unit 28 then determines whether a for-capture signature image 34b whose degree of resemblance to the signature image extracted in Step S132 is at least a for-capture degree of resemblance is stored in the storage unit 34 of the computer 30 (Step S133). That is, the control unit 28 checks for similarity in conformation between the signature image extracted in Step S132, and the for-capture signature images 34b stored in the storage unit 34 of the computer 30—namely, for similarity in the handwriting of the signatures.

If the control unit 28 determines in Step S133 that a for-capture signature image 34b of the for-capture degree of resemblance is in storage, then it determines whether among capture-prohibiting signature images 34c correlated with user identification information in turn correlated with the for-capture signature image 34b whose degree of resemblance to the signature image extracted in Step S132 is at least the for-capture degree of resemblance, a capture-prohibiting signature image 34c whose degree of resemblance to the signature image extracted in Step S132 is not less than a capture-prohibiting degree of resemblance is stored in the storage unit 34 of the computer 30 (Step S134). That is, the control unit 28 checks for similarity in conformation between the signature image extracted in Step S132, and the capture prohibiting signature image 34c stored in the storage unit 34 of the computer 30—namely, for similarity in the handwriting of the signatures. Herein, the capture prohibiting degree of resemblance is a degree of resemblance higher than the for-capture degree of resemblance— such as that in the case where the signature image extracted in Step S132 and the capture-prohibiting signature image 34c perfectly coincide.

If the control unit 28 determines in Step S134 that no capture-prohibiting signature image 34c of at least the capture-prohibiting degree of resemblance is in storage, then it transmits the read image read out in Step S131, and signature-image identification information for the for-capture signature image 34b determined in Step S133 to have a degree of resemblance not less than the for-capture degree of resemblance, to the computer 30 via the network communications unit 26 (Step S135), and terminates the operation represented in FIG. 5.

If the control unit 28 determines in Step S134 that a capture-prohibiting signature image 34c of at least the capture-prohibiting degree of resemblance is in storage, then it transmits the read image read out in Step S131, and signature-image identification information for the capture-prohibiting signature image 34c determined in Step S134 to have a degree of resemblance not less than the capture-prohibiting degree of resemblance, to the computer 30 via the network communications unit 26 (Step S136), and terminates the operation represented in FIG. 5.

If the control unit 28 determines in Step S133 that no for-capture signature image 34b of at least the for-capture degree of resemblance is in storage, then it transmits the read image read out in Step S131 to the computer 30 via the network communications unit 26 (Step S137), and terminates the operation represented in FIG. 5.

Next, the operation of the computer 30 when the computer 30 captures a read image will be described.

Figure 6:
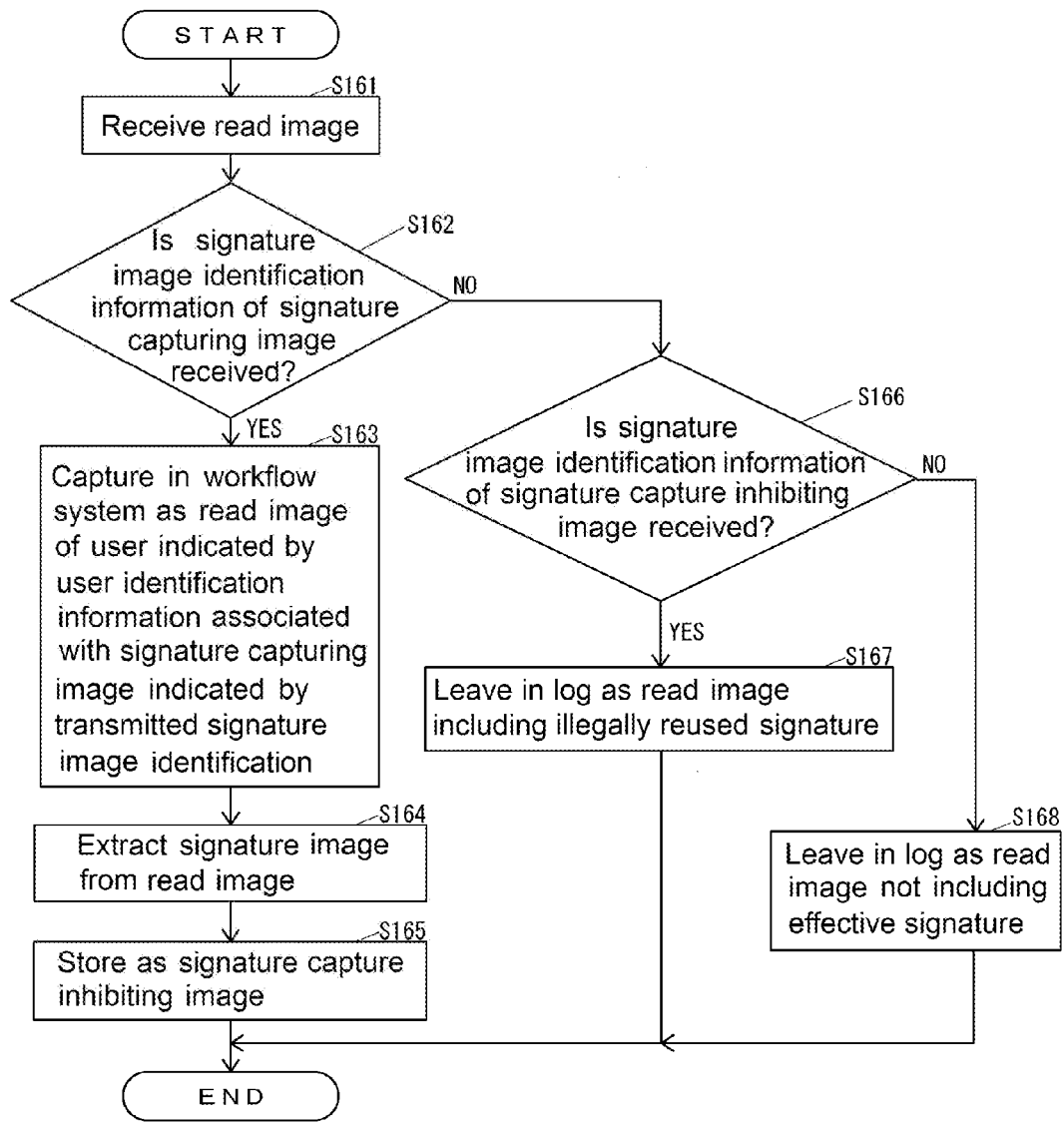
FIG. 6 illustrates an operation of the computer according to the embodiment when the computer captures a read image.

The read image capturing unit 35a of the computer 30 is a circuit that executes the operation indicated in FIG. 6 when a read image is transmitted from the MFP 20.

FIG. 6 illustrates the operation of the computer 30 when the computer 30 captures a read image.

As illustrated in FIG. 6, the read image capturing unit 35a of the computer 30 receives a read image transmitted from the MFP 20 via the network communication unit 33 (Step S161).

Next, the read image capturing unit 35a determines whether or not the read image capturing unit 35a has received the signature image identification information of the signature capturing image 34b together with the read image at Step S161 (Step S162).

Assume that the read image capturing unit 35a determines that the read image capturing unit 35a has received the signature image identification information of the signature capturing image 34b at Step S162. In this case, the read image capturing unit 35a captures the read image received at Step S161 in a workflow system, in association with a user indicated by the user identification information, which is associated with the signature capturing image 34b indicated by the transmitted signature image identification information (Step S163). Namely, the read image capturing unit 35a captures the read image in a workflow specified for each user. The computer 30 executes a subsequent process in the workflow system (not illustrated) after capturing the read image in the workflow system.

After the process at Step S163, the signature managing unit 35b extracts a signature image from the read image received at Step S161 (Step S164).

Next, the signature managing unit 35b causes the storage unit 34 to store the signature image extracted at Step S164 as the signature capture inhibiting image 34c in association with the user identification information, which is associated with the signature capturing image 34b indicated by the signature image identification information received at Step S161 (Step S165). Namely, the signature managing unit 35b causes the storage unit 34 to store the signature image as the signature capture inhibiting image 34c for each user.

After the termination of the process of Step S165, the signature managing unit 35b terminates the operation indicated in FIG. 6.

When the read image capturing unit 35a determines that the read image capturing unit 35a has not received the signature image identification information of the signature capturing image 34b at Step S162, the read image capturing unit 35a determines whether or not the read image capturing unit 35a has received the signature image identification information of the signature capture inhibiting image 34c together with the read image at Step S161 (Step S166).

When the read image capturing unit 35a determines that the read image capturing unit 35a has received the signature image identification information of the signature capture inhibiting image 34c at Step S166, the read image capturing unit 35a records the read image received at Step S161 in a log as a read image including a signature illegally reused (Step S167).

When the read image capturing unit 35a determines that the read image capturing unit 35a has not received the signature image identification information of the signature capture inhibiting image 34c at Step S166, the read image capturing unit 35a records the read image received at Step S161 in a log as a read image without valid signature (Step S168).

After the termination of the process of Step S167 or Step S168, the read image capturing unit 35a terminates the operation indicated in FIG. 6.

As described above, the read image capturing system 10 captures the read image in association with a user associated with the signature capturing image 34b, the similarity degree of which with the signature image included in the read image read by the scanner 23 is equal to or more than the similarity degree for capture (Step S163). Accordingly, the read image capturing system 10 can facilitate the operation for capturing the read image in association with the user. Namely, the read image capturing system 10 can capture the read image in association with the user without causing the user to log on using the ID and the password as conventional. Accordingly, the read image capturing system 10 can reduce the occurrence of congestion even when many users request to capture the read image one after another, for example.

When the similarity degree of the signature image included in the read image and the managed signature capture inhibiting image 34c is equal to or more than the similarity degree for inhibiting capture, the read image capturing system 10 inhibits capture of the read image (Step S167). Accordingly, the read image capturing system 10 can reduce the occurrence of impersonation by illegal use of a signature of another person included in the original document, from which the read image was captured in the past. For example, assume that after the signature of another person included in the original document, from which the read image is captured in the past, is copied, an original document to which the copied signature is attached is prepared. In this case, the read image capturing system 10 can inhibit capturing the read image read by the scanner 23 from such an unauthorized original document.

The read image capturing system 10 manages the signature image included in the captured read image as the signature capture inhibiting image 34c in association with the user associated with the read image (Step S165). Accordingly, the read image capturing system 10 can enhance the function to reduce the occurrence of impersonation every time the read image capturing system 10 captures the read image.

The read image capturing system 10 may manages the signature image included in the captured read image as the signature capturing image 34b in association with the user associated with the read image, similarly to the process at Step S165. When the read image capturing system 10 manages the signature image included in the captured read image as the signature capturing image 34b in association with the user associated with the read image, the read image capturing system 10 can enhance the function to capture the read image in association with the user every time the read image capturing system 10 captures the read image.

When the read image capturing system 10 manages a plurality of the signature capturing images 34b of an identical user, the read image capturing system 10 can employ various kinds of conditions as the condition for capturing the read image. For example, the read image capturing system 10 may have a configuration not to capture the read image if the signature image included in the read image does not have the similarity degree equal to or more than the similarity degree for capture with all the plurality of the signature capturing images 34b of the identical user. The read image capturing system 10 may have a configuration to capture the read image if the signature image included in the read image has the similarity degree equal to or more than the similarity degree for capture with any one of the plurality of the signature capturing image 34b of the identical user.

The read image capturing system 10 is constituted to include the MFP 20 and the computer 30. However, the read image capturing system of the disclosure may be constituted of the MFP 20 alone. Namely, the MFP 20 may include the function of the computer 30. When the MFP 20 includes the function of the computer 30, the MFP 20 constitutes the read image capturing device of the disclosure.

According to the embodiment, the MFP 20 executes the process such as confirmation of the similarity degree of the read image with the signature capturing image 34b and the signature capture inhibiting image 34c in addition to reading the image from the original document and transmitting the read image to the computer 30. However, the MFP 20 may execute to read the image from the original document and to transmit the read image to the computer 30 only. Namely, the process such as confirmation of the similarity degree of the read image with the signature capturing image 34b and the signature capture inhibiting image 34c may be executed by the computer 30.

According to the embodiment, while an MFP is employed as an image reading apparatus, an image reading apparatus other than the MFP such as a scan-only machine may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A read image capturing system, comprising:
    a reading device that reads images from original documents;
    a read-image capturing circuit that captures read images read by the reading device; and
    a signature managing circuit that manages signature images for causing the read-image capturing circuit to capture, on a per-user basis, read images as for-capture signature images; wherein
    the read-image capturing circuit in capturing a read image correlates the read image to a user correlated by the signature managing circuit with a for-capture signature image whose degree of resemblance to a signature image included in the read image is at least a for-capture degree of resemblance,
    the signature managing circuit manages, as capture-prohibiting signature images on a per-user basis, signature images for prohibiting the read image capturing circuit from capturing read images, and
    the read-image capturing circuit prohibits read-image capture when a degree of resemblance between a signature image included in a read image, and a capture-inhibiting signature image managed by the signature managing circuit is not less than a capture-prohibiting degree of resemblance that is higher than the for-capture degree of resemblance.

2. The read image capturing system according to claim 1, wherein the signature managing circuit manages signature images included in read images captured by the read-image capturing circuit as capture-prohibiting signature images correlated with users in turn correlated by the read-image capturing circuit with read images.

3. The read image capturing system according to claim 1, wherein the signature managing circuit manages signature images included in read images captured by the read-image capturing circuit as for-capture signature images correlated with users in turn correlated by the read-image capturing circuit with read images.

4. The read image capturing system according to claim 1, wherein when the signature managing circuit receives input of a combination of user identification information and signature images included in read images, the signature managing circuit manages the input signature images as for-capture signature images and capture-prohibiting signature images correlated with the user identification information.

5. The read image capturing system according to claim 1, wherein the capture-prohibiting degree of resemblance is equivalent to a signature image included in a read image coinciding with a capture-prohibiting signature image.

6. A read image capturing device for capturing read images read by a reading device for reading images from original documents, comprising:
    a read-image capturing circuit that captures read images;
    a signature managing circuit that manages signature images for causing the read-image capturing circuit to capture, on a per-user basis, read images as for-capture signature images; wherein
    the read-image capturing circuit in capturing a read image correlates the read image to a user correlated by the signature managing circuit with a for-capture signature image whose degree of resemblance to a signature image included in the read image is at least a for-capture degree of resemblance,
    the signature managing circuit manacles, as capture-prohibiting signature images on a per-user basis, signature images for prohibiting the read image capturing circuit from capturing read images, and
    the read-image capturing circuit prohibits read-image capture when a degree of resemblance between a signature image included in a read image, and a capture-inhibiting signature image managed by the signature managing circuit is not less than a capture-prohibiting degree of resemblance that is higher than the for-capture degree of resemblance.

7. The read image capturing device according to claim 6, wherein the signature managing circuit manages signature images included in read images captured by the read-image capturing circuit as capture-prohibiting signature images correlated with users in turn correlated by the read-image capturing circuit with read images.

8. The read image capturing device according to claim 6, wherein the signature managing circuit manages signature images included in read images captured by the read-image capturing circuit as for-capture signature images correlated with users in turn correlated by the read-image capturing circuit with read images.

9. The read image capturing device according to claim 6, wherein when the signature managing circuit receives input of a combination of user identification information and signature images included in read images, the signature managing circuit manages the input signature images as for-capture signature images and capture-prohibiting signature images correlated with the user identification information.

10. The read image capturing device according to claim 6, wherein the capture-prohibiting degree of resemblance is equivalent to a signature image included in a read image coinciding with a capture-prohibiting signature image.

11. A non-transitory computer-readable recording medium storing a read image capturing program for controlling a read image capturing device that captures read images read by a reading device for reading images from original documents, the read image capturing program causing a computer to function as:

the read image capturing circuit; and a signature managing circuit that manages signature images for causing the read-image capturing circuit to capture, on a per-user basis, read images as for-capture signature images; wherein the read-image capturing circuit in capturing a read image correlates the read image to a user correlated by the signature managing circuit with a for-capture signature image whose degree of resemblance to a signature image included in the read image is at least a for-capture degree of resemblance, the signature managing circuit manages, as capture-prohibiting signature images on a per-user basis, signature images for prohibiting the read image capturing circuit from capturing read images, and the read-image capturing circuit prohibits read-image capture when a degree of resemblance between a signature image included in a read image, and a capture-inhibiting signature image managed by the signature managing circuit is not less than a capture-prohibiting degree of resemblance that is higher than the for-capture degree of resemblance.

12. The non-transitory computer-readable recording medium according to claim 11, wherein the signature managing circuit manages signature images included in read images captured by the read-image capturing circuit as capture-prohibiting signature images correlated with users in turn correlated by the read-image capturing circuit with read images.

13. The non-transitory computer-readable recording medium according to claim 11, wherein the signature managing circuit manages signature images included in read images captured by the read-image capturing circuit as for-capture signature images correlated with users in turn correlated by the read-image capturing circuit with read images.

14. The non-transitory computer-readable recording medium according to claim 11, wherein when the signature managing circuit receives input of a combination of user identification information and signature images included in read images, the signature managing circuit manages the input signature images as for-capture signature images and capture-prohibiting signature images correlated with the user identification information.

15. The non-transitory computer-readable recording medium according to claim 11, wherein the capture-prohibiting degree of resemblance is equivalent to a signature image included in a read image coinciding with a capture-prohibiting signature image.

* * * * *